US005458666A

United States Patent [19]

Miyakata

[11] Patent Number: 5,458,666

[45] Date of Patent: Oct. 17, 1995

[54] FILTER ELEMENT OF AIR CLEANER UNIT

[76] Inventor: Yoshihito Miyakata, 14-15, Sakaiminamicho 5-chome, Musashino-shi, Tokyo, Japan

[21] Appl. No.: 344,958

[22] Filed: Nov. 25, 1994

[30] Foreign Application Priority Data

Oct. 24, 1994 [JP] Japan .............................. 6-014269 U

[51] Int. Cl.[6] .................................................... B01D 46/00

[52] U.S. Cl. ................................ 55/327; 55/336; 55/498; 55/521; 55/DIG. 28

[58] Field of Search ............................. 55/327, 331, 336, 55/385.3, 434, 498, 521, DIG. 28

[56] References Cited

U.S. PATENT DOCUMENTS

| | | | |
|---|---|---|---|
| 203,121 | 4/1878 | Connelly et al. | 55/331 |
| 352,063 | 11/1886 | Optenberg | 55/331 |
| 1,026,143 | 5/1912 | Bennett | 55/336 |
| 1,202,953 | 10/1916 | Adams | 55/521 |
| 2,983,592 | 5/1961 | Jones | 55/DIG. 28 |
| 3,224,174 | 12/1965 | Erbstoesser | 55/DIG. 28 |
| 4,871,381 | 10/1989 | Smith | 55/385.3 |
| 5,320,657 | 6/1994 | Adams | 55/521 |

*Primary Examiner*—C. Scott Bushey
*Attorney, Agent, or Firm*—Rogers & Killeen

[57] ABSTRACT

There is provided a filter element of an air cleaner unit of an open element type which prevents turbulent flow from arising to lower the air suction sound and avoid the loss of sucked air by the turbulent flow. In a filter element in which a major diameter side opening of a tapered cylindrical filter member with a zigzag shaped cross section is connected to a suction duct of an engine, a rectifying cone member for covering a minor diameter side opening by the root thereof is vertically mounted inside the minor diameter side opening so that its leading end is positioned at or near the end of the major diameter side opening of the filter element, and furthermore, the inner side of a suction duct connecting member formed at the major diameter side opening is shaped like an air funnel.

3 Claims, 2 Drawing Sheets

FILTER ELEMENT OF AIR CLEANER UNIT

BACKGROUND OF THE INVENTION

1. Field of the Invention

The present invention relates to a structure of a filter element of an air cleaner unit of an open element type built in an engine of an automobile and the like.

2. Description of the Related Art

Although a typical air cleaner unit built in an air suction system of an automobile engine is of a covered type in which a filter element is housed in an air cleaner case connected to a suction duct, an air cleaner unit of an open element type, in which a filter element itself is directly connected to a suction duct without any cover such as an air cleaner case, is also known as one of options or replacement parts.

In such an open-element air cleaner unit, since the filter element is exposed outside, the air suction efficiency is higher than that of the covered type, by which an output increase effect of the engine can be obtained. Therefore, the open-element air cleaner unit is often substituted for an existing one in, for example, a sports car. However, since the mount space in an engine room is limited, the shape and structure of the filter element are so designed as to achieve high air suction efficiency.

FIG. 2 is a sectional view showing an example of a conventional air cleaner unit 10 of the above-mentioned open element type. A filter element 11 is shaped like a tapered cylinder with a filter wall made of an adequate filter material, such as paper, cloth and nonwoven cloth, and having a zigzag shaped cross section. A ring-shaped connecting member 12 made of synthetic rubber and having a suction duct connecting opening 12*a*, and an edge member 13 made of synthetic rubber with a metallic blank cap member 13*a*, are respectively integrally connected by vulcanization adhesion to ends of major and minor diameter side openings of the filter element 11. The air cleaner unit 10 is mounted in an engine by fixing the suction duct connecting opening 12*a* in engagement with a joint fitting 20 connected through a joint collar 21 made of rubber and the like, and connecting the collar 21 to an inlet pipe 22 on the side of the engine.

Only a peripheral part of the blank cap member 13*a* of the air cleaner unit 10 and the edge member 13 may be combined into one rubber ring.

In the conventional air cleaner unit 10 shown in FIG. 2, the filter element 11 is formed as a tapered air suction plane having a zigzag shaped cross section, by which a large air suction area can be secured even if the occupation capacity, that is, the outer dimensions thereof, are relatively small. Accordingly, it is possible to efficiently suck more air with the filter element 11 having small outer dimensions.

However, it is pointed out that turbulent flow arises almost just under the blank cap member 13*a* when air is sucked through the tapered cylindrical filter wall of the filter element 11 in the above-mentioned conventional air cleaner unit 10, and that the turbulent flow makes the air suction sound louder and causes a considerable loss of sucked air.

SUMMARY OF THE INVENTION

With this problem in view, it is an object of the present invention to provide a filter element of an air cleaner unit of an open element type which prevents turbulent flow from arising in air suction, to make the air suction sound low, and avoid the loss of sucked air.

In order to achieve the above object, there is provided a filter element formed by a tapered cylindrical filter material having a zigzag shaped cross section and having an opening on the major diameter side connected to a suction duct of an engine, wherein a rectifying cone member for covering a minor diameter side opening of the filter element by the root thereof is vertically mounted in the minor diameter side opening so that the leading end thereof is positioned at or near the end of the major diameter side opening of the filter element.

Furthermore, the inner side of a suction duct connecting member formed at the major diameter side opening is shaped like an air funnel.

In the filter element of the present invention, since air sucked through a filter plane of the element is extremely efficiently rectified by the action of the rectifying cone member, whose leading end is elongated to reach the major diameter side opening, the air suction sound is low, and the suction efficiency is not lowered since most of turbulent flow of sucked air is prevented from arising by the rectification.

DESCRIPTION OF THE PREFERRED EMBODIMENT

A preferred embodiment of the present invention will now be described in detail with reference to the attached drawing.

Figure 1:
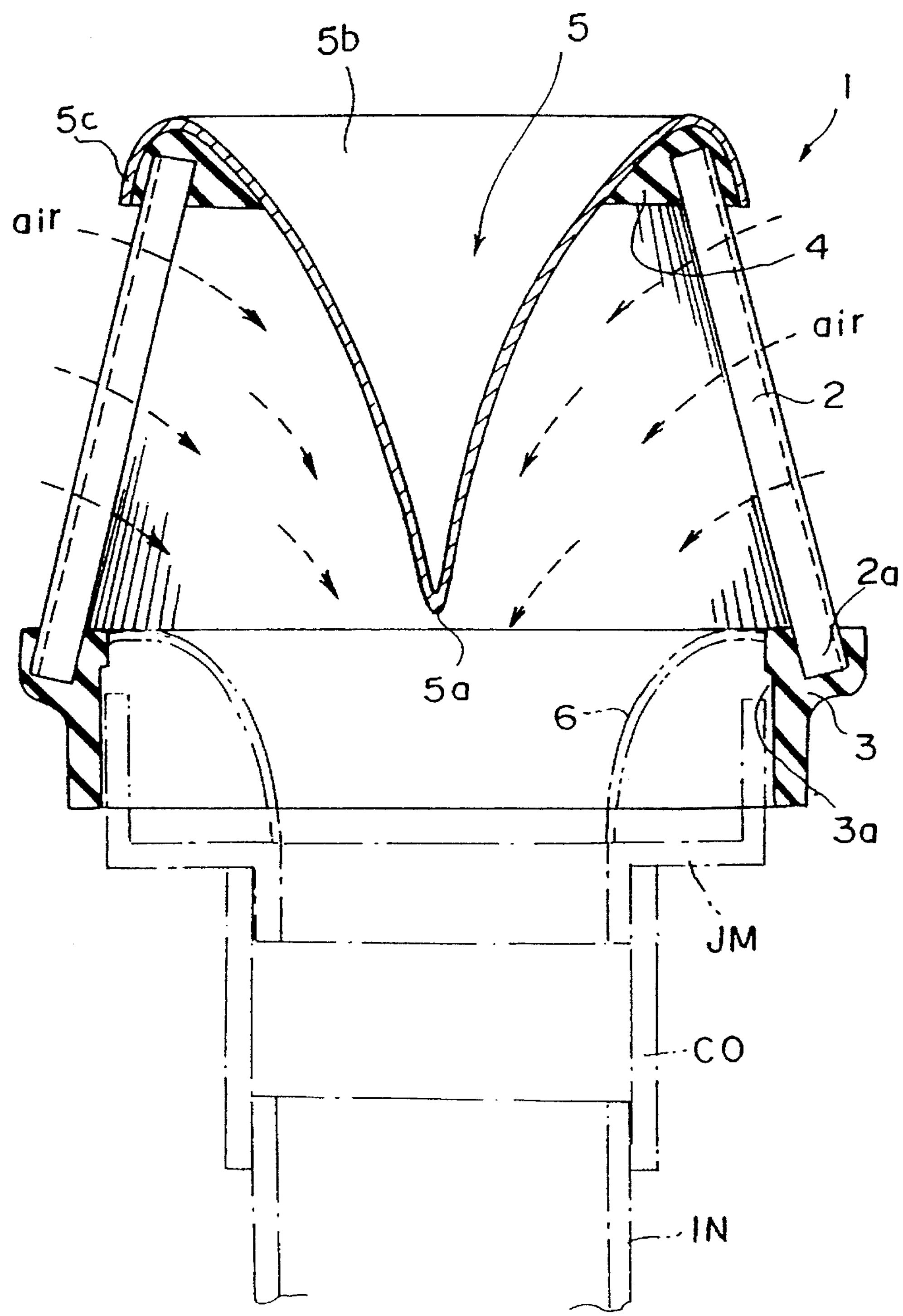
FIG. 1 is a longitudinal sectional view of an embodiment of a filter element according to the present invention.
Figure 2:
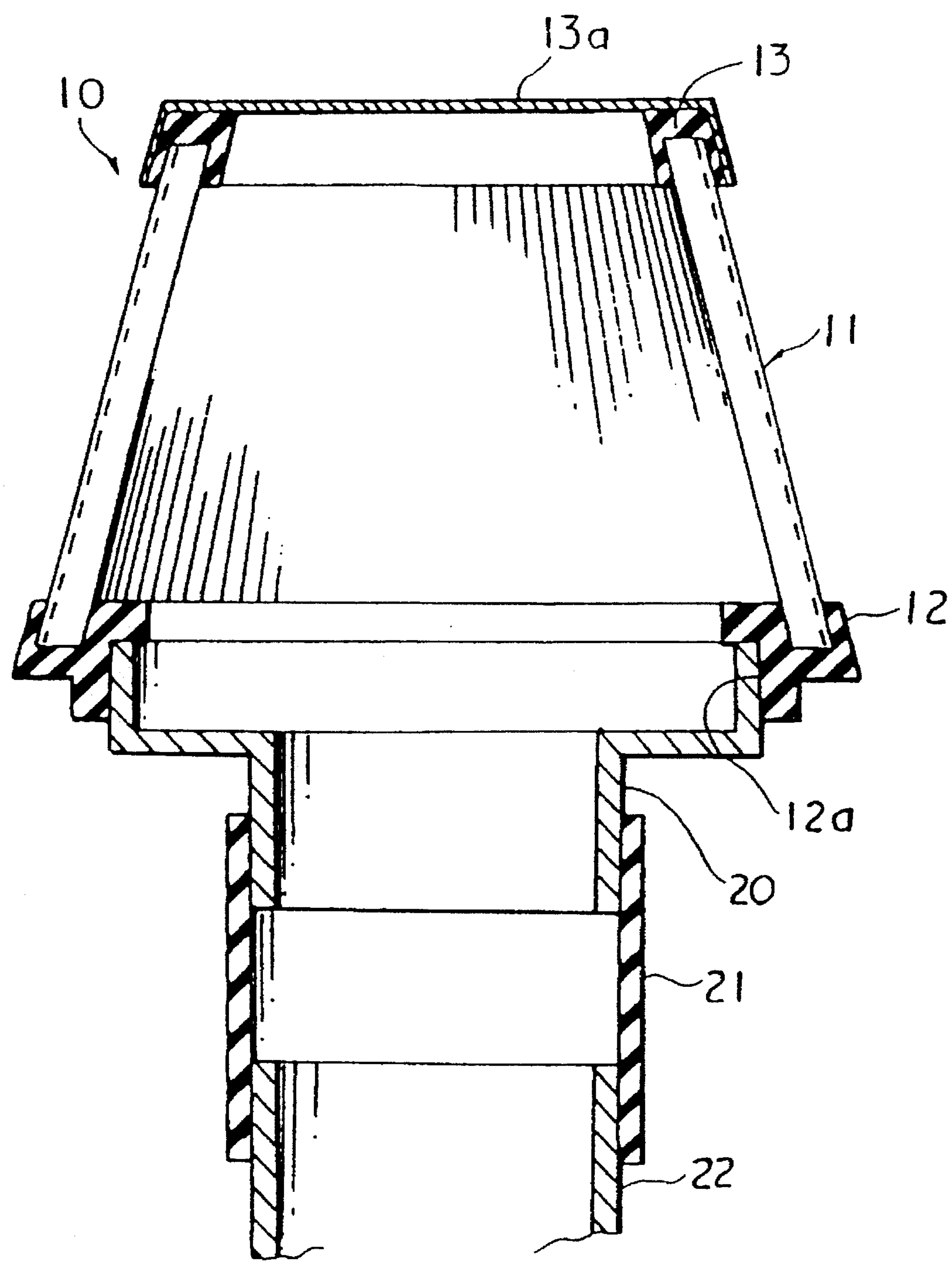
FIG. 2 is a longitudinal sectional view of a filter element in a conventional air cleaner unit.

Referring to FIG. 1, an air cleaner unit 1 comprises a filter element 2, a connecting member 3 formed at the end of an opening on the major diameter side of the element 2 to be connected to a suction duct on the side of an engine, an edge member 4 formed at the end of an opening on the minor diameter side of the element 2, and a rectifying cone member 5 whose root is connected to the minor diameter side opening of the element 2.

The filter element 2 is formed by a tapered cylindrical filter material made of cloth, paper, nonwoven cloth and the like. In order to ensure a large filter area of a filter plane, a cross section of the cylindrical element 2 along the circumferential direction is zigzag shaped. Although it is assumed that the filter element 2 is reinforced by covering outer and inner sides thereof with metal mesh (not shown), if it is not reinforced by the metal mesh, the function as the filter element does not change.

The connecting member 3 shown in FIG. 1 is made of synthetic rubber and the like in the shape of a ring integrally formed by vulcanization adhesion with an end 2*a* of the major diameter side opening of the filter element 2 so that the end 2*a* is embedded therein, and has a suction duct connecting opening 3*a* with a tier on the inner side thereof. The suction duct connecting opening 3*a* is fixed in engagement with a joint metal fitting JM connected to an inlet pipe IN as a component of a suction system of the engine through a collar CO made of rubber in this embodiment.

A ring-shaped edge member 4 made of synthetic rubber and the like is stuck by vulcanization to the top end of the filter element 2, and is so formed as to function as a support ring for the rectifying cone member 5 mentioned below.

A root 5*b* of the rectifying cone member 5 (on the major diameter side) is formed into a curved bent portion 5c along the outer side of the edge member 4, and thereby, held by adhesion or the like on the outer side of the edge member 4 at an end 2b of the minor diameter side opening of the filter element 2 as shown in FIG. 1. Furthermore, a leading end 5a of the rectifying cone member 5 is so formed as to be set in almost the same position as the major diameter side opening end 2a of the filter element 2.

The rectifying cone member 5 is made of an arbitrary material, such as paper, plastic, metal and ceramics, and the outer surface thereof is smooth and is shaped like an exponential cone. The rectifying cone member 5 may be made of a porous material so as to suck outside air therethrough. In this case, it is preferable that the air permeability be lower than that of the filter element 2 in order to maintain the rectification effect.

Since the flow of air sucked through the outer peripheral surface of the filter element 2 of the present invention shown in FIG. 1 into the element 2 is rectified by the outer surface of the rectifying cone member 5 and directed toward the inlet pipe IN, turbulent flow which arises in the conventional filter element without the rectifying cone member 5 does not arise. Therefore, the air suction sound is extremely low, and the suction efficiency is not lowered.

In the present invention, in order to complement or enhance the rectification effect of the rectifying cone member 5, an air funnel member 6 shown by virtual lines in FIG. 1 is placed inside the connecting member 3 formed at the major diameter opening end 2a of the filter element 2. The placement of the air funnel member 6 inside the connecting member 3 enhances the rectification effect and the air suction efficiency of air sucked through the whole plane of the main filter 2 without impairment of the suction efficiency.

As described above, since turbulent flow of sucked air is prevented from arising by disposing the rectifying cone member, whose leading end is positioned near the major diameter opening end, inside the tapered cylindrical filter element, the air suction sound is low and the air suction efficiency is not lowered.

Furthermore, since the air funnel member is disposed inside the connecting member at the major diameter opening end of the filter element, the effects of the above-mentioned prevention of turbulent flow and securement of the air suction efficiency are enhanced, and the utility as an air filter element is also increased.

What is claimed is:

1. A filter element of an air cleaner unit formed by a tapered cylindrical filter material having a zigzag shaped cross section and having an opening on the major diameter side connected to a suction duct of an engine, wherein a rectifying cone member for covering a minor diameter side opening of said filter element by the root thereof is vertically mounted in said minor diameter side opening of said filter element so that the leading end thereof is positioned at or near the end of said major diameter side opening of said filter element.

2. A filter element of an air cleaner unit according to claim 1, wherein the root of said rectifying cone member is attached outside of said minor diameter side opening of said filter element.

3. A filter element of an air cleaner unit according to claim 1 or 2, wherein an air funnel is formed inside a suction duct connecting member formed at said major diameter side opening of said tapered cylindrical filter element.

* * * * *